(12) United States Patent
Osei-Kusi

(10) Patent No.: US 12,233,731 B2
(45) Date of Patent: Feb. 25, 2025

(54) SYSTEM AND METHOD FOR A FIELD REPAIRABLE AND UPGRADABLE ELECTRIC VEHICLE CHARGER

(71) Applicant: Kwabena Osei-Kusi, Frederick, MD (US)

(72) Inventor: Kwabena Osei-Kusi, Frederick, MD (US)

(73) Assignee: Pirl Technology, Inc., Frederick, MD (US)

( * ) Notice: Subject to any disclaimer, the term of this patent is extended or adjusted under 35 U.S.C. 154(b) by 0 days.

(21) Appl. No.: 18/349,493

(22) Filed: Jul. 10, 2023

(65) Prior Publication Data

US 2024/0010086 A1 Jan. 11, 2024

Related U.S. Application Data

(60) Provisional application No. 63/368,072, filed on Jul. 11, 2022.

(51) Int. Cl.
| | | |
|---|---|---|
| *B60L 53/30* | (2019.01) | |
| *B60L 53/60* | (2019.01) | |
| *B60L 53/10* | (2019.01) | |
| *B60L 53/18* | (2019.01) | |

(52) U.S. Cl.
CPC ............. *B60L 53/30* (2019.02); *B60L 53/305* (2019.02); *B60L 53/60* (2019.02); *B60L 53/11* (2019.02); *B60L 53/18* (2019.02)

(58) Field of Classification Search
CPC ....................................................... B60L 53/30
USPC .......................................................... 320/109
See application file for complete search history.

(56) References Cited

U.S. PATENT DOCUMENTS

| | | | | |
|---|---|---|---|---|
| 8,413,833 | B1* | 4/2013 | Taylor | H05K 5/061 |
| | | | | 220/675 |
| 2003/0120442 | A1* | 6/2003 | Pellegrino | G07F 15/005 |
| | | | | 702/63 |
| 2019/0351783 | A1* | 11/2019 | Goei | B60L 53/63 |
| 2020/0070672 | A1* | 3/2020 | Vahedi | H02M 7/219 |
| 2020/0329579 | A1* | 10/2020 | Triplett | G06F 1/187 |
| 2022/0024334 | A1* | 1/2022 | Marczi | H02J 7/0013 |
| 2022/0332201 | A1* | 10/2022 | Khamashta | B60L 53/18 |
| 2023/0166630 | A1* | 6/2023 | Hafezinasab | B60K 1/04 |
| | | | | 180/65.8 |

* cited by examiner

*Primary Examiner* — Jerry D Robbins
(74) *Attorney, Agent, or Firm* — GIBRALTAR CONSULTING LLC; Tariq S. Najee-Ullah

(57) ABSTRACT

An electric vehicle charger that comprises a display screen, an input power cable, an output power cable with a plug, a removable motherboard that houses the electronics of the charging circuit, a set of screws holding the motherboard to the enclosure, and a camera. The camera is mounted at the front of the display. The display is a touchscreen-capable display that shows content that can be provided wirelessly. The motherboard is attached to a racking mechanism that allows it to be removed from the charging station. When removed, the motherboard can be repaired or replaced with a new motherboard of the same capability or a new motherboard with improved capabilities. This process can be done while the charger is installed in the field. A real-time electric charger monitoring system is also implemented that can monitor operational parameters of the electric vehicle charger in real-time to ensure optimal function.

11 Claims, 5 Drawing Sheets

SYSTEM AND METHOD FOR A FIELD REPAIRABLE AND UPGRADABLE ELECTRIC VEHICLE CHARGER

FIELD OF DISCLOSURE

The present invention relates generally to electric vehicles, electric vehicle chargers, and modular approaches to electric vehicle chargers allowing for access of the internal charging circuits and electronic components to repair, replace and upgrade.

RELATED APPLICATIONS

Under provisions of 35 U.S.C. § 119(e), the Applicant claim the benefit of U.S. provisional application No. 63/368,072, filed Jul. 11, 2022, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

BACKGROUND OF THE DISCLOSURE

Electric vehicles (EVs) are rapidly gaining mainstream acceptance with millions sold globally as economies transition from petroleum-powered to battery-powered transport. However, the charging stations (or chargers) needed to transfer energy from a power source, such as the grid, to the onboard batteries of electric vehicles face several challenges.

Chargers experience significant wear and tear, and acts of vandalism, that often make them unavailable for use. The current state of art requires customers to call or email to report a non-working charger. The repair period can take several weeks, since an electrician needs to visit the installation, determine the fault, order the parts, and return to complete the repair. During this downtime, EV owners experience increased range anxiety as the reduced ability to charge limits the range of their vehicles. The downtime also reduces the revenue of commercial charging station owners.

Another challenge of charging stations is the risk of obsolescence. Charging technology is rapidly evolving and installed chargers are quickly becoming out-of-date. To keep up, charging station owners, especially commercial ones, must replace them often. If the current situation continues, by 2030, over a million tons of electronic waste is expected to be generated from discarded charging stations. This is financially and environmentally expensive.

There are two categories of chargers based on the current delivered: alternating current (AC) and direct current (DC). These are further divided into three types based on the power level: Level 1 (AC) outputs power in the 1.3 kW and 2.4 kW range; Level 2 (AC) outputs power in the 3 kW to 19 kW range; and Level 3 (DC) operates with an output of 350 kW and more.

There are conventional approaches utilized for charging electric and hybrid vehicles. However, as alluded to above, there are currently no systems and/or approaches that are currently available in the realm of EVs that allows access to the internal electronics of currently deployed EV charging stations, as a means to repair and/or upgrade the chargers. Therefore, there still exists a need in the field for a novel EV charger that can be easily repaired and upgraded after the device is deployed and currently installed for use.

BRIEF OVERVIEW

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are and explanatory only and are not restrictive of the disclosure, as claimed.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE DISCLOSURE

Figure 1:
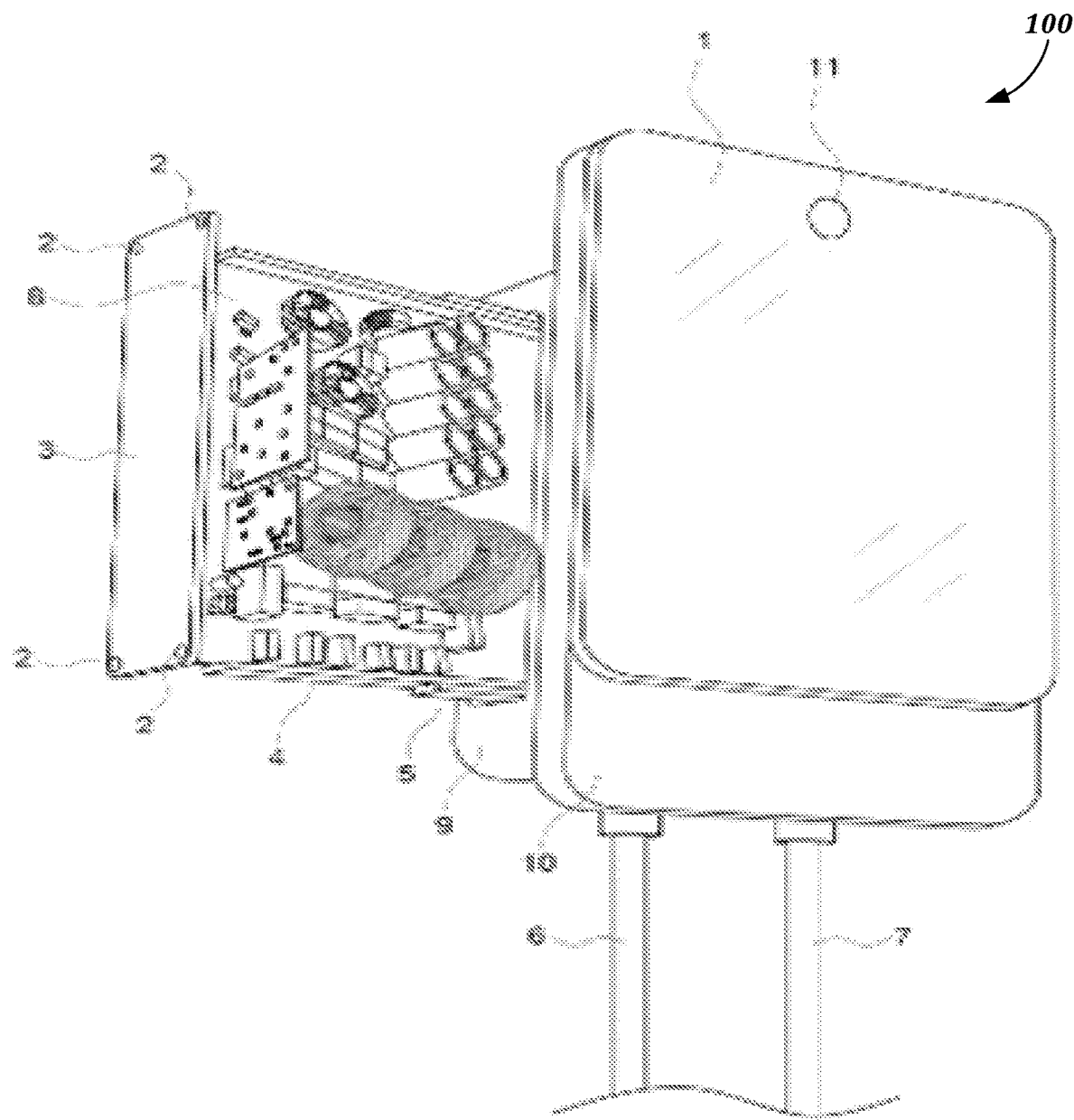
FIG. 1 depicts an example field repairable and upgradable electric vehicle (EV) charger at a perspective view and having a motherboard container partially removed during operation, according to one or more embodiments shown and described herein.

The present disclosure includes many aspects and features. Moreover, while many aspects and features relate to, and are described in, the context of a field repairable and upgradable electric vehicle charger, embodiments of the present disclosure are not limited to use only in this context. The present disclosure can be understood more readily by reference to the following detailed description of the disclosure and the examples included therein.

Before the present articles, systems, apparatuses, and/or methods are disclosed and described, it is to be understood that they are not limited to specific methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated, some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed apparatuses, systems, and articles of the disclosure as well as the apparatuses themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and apparatuses of the disclosure. Thus, if there are a variety of additional steps that can be performed it is understood that each of these additional steps can be performed with any specific aspect or combination of aspects of the methods of the disclosure.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

With reference now to the drawings, and in particular FIG. 1 through FIG. 5 thereof, examples of the field repairable and upgradable electric vehicle charger and the principles and concepts thereof will be described.

In an embodiment, a field repairable and upgradable electric vehicle charger implements an electric vehicle (EV) charger which distinctly includes charging circuits and internal electronics that are placed on a removable motherboard. The motherboard contains the charging circuits which receive energy from a source such as the electric grid and delivers it to the onboard battery of an electric vehicle. Thus, the disclosed embodiments realize a new approach in EV chargers by implementing removable components, such as a removable motherboard. Once removed, the motherboard can be repaired or replaced with an updated module, making the field repairable and upgradable electric vehicle charger retrofittable. Furthermore, the field repairable and upgradable electric vehicle charger, as disclosed herein, realizes a plethora of advantages associated with achieving modularity in charger components including the capability to repair and/or upgrade the field repairable and upgradable electric vehicle charger while the charger is currently installed and on a site.

In an embodiment, a real-time EV charger monitoring system is implemented as a comprehensive sensor system for monitoring the operational parameters of an EV charger in real-time during its operation to ensure that the EV charger is operating optimally. The real-time EV charger monitoring system can be utilized with the field repairable and upgradable electric vehicle charger, as disclosed herein. For example, the real-time EV charger monitoring system includes a plurality of sensors that collect real-time data from several components of the EV charger in manner that allows the system to obtain and analyze operational parameters indicating how the EV charger is currently operating. Thus, by actively monitoring the function of the EV charger in real-time while in use (e.g., real-time data collection and analysis), the real-time EV charger monitoring system can enhance the EV charger's charging efficiency, safety, and overall performance. Moreover, operational information for EV chargers that can be gleaned from the real-time EV charger monitoring system over time can be used to improve the design and development of EV chargers in a manner that improves on any degradation and failures detected after deployment (e.g., while the EV chargers are being used in the field), thereby providing better performance for EV chargers currently used in industry and in the future to progress the technology.

In order to combat negative impacts on the climate and cutting emissions associated with industry, transportation, motorized vehicles, etc., the development of new clean energy technologies has emerged. One such "clean energy" technology is electric vehicles (EVs), where EVs are designed to convert electrical energy (e.g., from a battery) into mechanical energy in a manner that eliminates the cost and unclean emissions related to gasoline fueling. An EV is defined as a vehicle that can be powered by an electric motor that draws electricity from a stored energy source, such as a rechargeable battery or fuel cell, and is capable of being charged from an external source. Some EVs are considered all-electric vehicles, being powered only by an electric motor that draws electricity from a battery. Other EVs are hybrids, where the vehicle can be powered by an electric motor that draws electricity from a battery and is also propelled by an internal combustion engine, such as a plug-in hybrid electric vehicle. EVs may realize a plethora of benefits, in addition to the environmental advantages (e.g., zero tailpipe emissions), including smooth electric performance, energy efficiency, convenience, and lower maintenance costs (e.g., fewer moving parts than gasoline vehicles).

Many EVs have batteries that are energy-dense lithium-ion type batteries. Typically, a bigger battery (measured in kilowatt-hours, or kWh) means more electric range. In general, EVs are cheaper to recharge in comparison to refueling gasoline vehicles. For instance, with every mile of driving, the cost of electricity to recharge an EV is typically a fraction of what that same mile would cost to refuel with gasoline. The battery of an EV can be recharged using an external source, also referred to as an EV charger (also referred to herein as a charging station). An EV charger (or electric vehicle supply equipment) is a piece of equipment that supplies electrical power for charging plug-in EVs. There are two main types of charging stations: AC charging stations and DC charging stations. Recharging an EV often involves inserting a charging plug from the charging station into the charge port of the EV. For example, the charging plug of the EV can be considered equivalent to a fuel nozzle at a gas station. Electrically recharging EVs provide several benefits over gasoline refueling, such as increased simplicity, cost-effectiveness, and convenience.

FIG. 1 depicts an example configuration of the field repairable and upgradable electric vehicle charger 100. As disclosed herein, the field repairable and upgradable electric vehicle charger 100 implements an EV charger (or electric vehicle supply equipment), where the repairable and upgradable electric vehicle charger 100 functions as a piece of equipment that supplies electrical power for charging plug-in EVs. As a general description, the field repairable and upgradable electric vehicle charger 100 is electric vehicle supply equipment that is modularly designed, having at least one accessible compartment (e.g., removable container), and charging circuits and internal electronics that are implemented on a removable motherboard. The motherboard contains the charging circuits which receive energy from a source such as the electric grid and delivers it to the onboard battery of an electric vehicle. The invention represents a new approach in chargers by presenting a removable motherboard. Once removed, the motherboard can be repaired or replaced with an updated module, making the invention retrofittable. This can be done while the charger is installed and on a site. This modular architecture is centered on the removable motherboard container (3). The charger is mechanically de-energized by disconnecting the input power source (6). The charger can also be de-energized electronically through a signal sent wirelessly to the charging circuit via Bluetooth or Wi-Fi, among other processes and designs used in the current state of the art to de-energize live electric components. After de-energizing, the motherboard container (3) can be safely unscrewed and removed.

FIG. 1 illustrates an example configuration that is suitable for the field repairable and upgradable electric vehicle charger 100 to be employed as a Level 2 EV Charger. However, it should be understood that the example configuration for the field repairable and upgradable electric vehicle charger 100 shown FIG. 1 is not intended to be limiting and that the elements and functions of the disclosed embodiments can be applied to across a wide range of EV chargers in the industry having varying current (e.g., AC and DC) and voltage requirements. For example, it will be evident to one skilled in the art that the disclosed embodiments may accommodate the design and the power requirements (e.g., higher, or lower) of Level 1, Level 2 and Level 3 types of EV chargers without departing from the scope of the disclosure.

As background, EVs can be charged using EV chargers (or EVSE) operating at different charging speeds. For example, Level 1 EV chargers and Level 2 EV chargers are standard forms of electric vehicle supply equipment that are currently used in industry, distinguished by their charging speed, voltage, and the corresponding infrastructure that is required.

Level 1 EV chargers operate on a standard residential 120-V (120V) AC outlet and typically deliver power in a range of 1.4-1.9 kilowatts (kW). Generally, Level 1 EV chargers are the most basic and widely available form of EV charging and can be easily installed using a common (e.g., household) electrical outlet. However, due to its lower power output, Level 1 EV chargers function relatively slowly and may take several hours (e.g., overnight) to fully charge an electric vehicle, depending on its battery capacity. For example, Level 1 chargers can take 40-50+ hours to charge a Battery Electric Vehicle (BEV) to 80 percent from empty and 5-6 hours for a Plug-In Hybrid Electric Vehicle (PHEV). As previously described, the disclosed field repairable and upgradable electric vehicle charger 100 can be configured as a Level 1 EV charger in some embodiments, without departing from the scope of the disclosure.

Level 2 EV chargers offer high-rate AC charging for EVs (in comparison to Level 1 EV chargers). Level 2 EV chargers are configured to charge through 240V (in residential applications) or 208V (in commercial applications) electrical service, similar to that used for large appliances (e.g., electric stoves, dryers, etc.). Level 2 EV chargers can deliver power in a range of 7-19 kW, and provide significantly faster charging in comparison to Level 1 EV chargers. With Level 2 EV chargers, an EV can charge at a much higher rate, reducing the charging time to a few hours or less. For example, a Level 2 EV charger can charge a BEV to 80 percent from empty in 4-10 hours and a PHEV in 1-2 hours. Level 2 EV charging stations typically require professional installation, for instance by an electrician, and are commonly found in public charging stations, workplaces, and residential settings. Level 2 and Level 3 (described in detail in reference to FIG. 3) equipment have been deployed at various public locations including, for example, at grocery stores, theaters, or coffee shops. Level 2 EV chargers differ from the aforementioned Level 1 EV chargers due to charging speed (e.g., power output) and voltage requirements. When selecting between Level 1 and Level 2 charger type for design and use, considerations can include voltages, resulting charging and vehicle dwell times, available infrastructure, individual charging needs, and estimated up-front and ongoing costs.

The field repairable and upgradable electric vehicle charger 100 implemented as a Level 2 EV charger, as shown in FIG. 1, can be used as a charging station. For example, the field repairable and upgradable electric vehicle charger 100 can be installed as a wall-mounted or freestanding charging station. In operation, the field repairable and upgradable electric vehicle charger 100 acts as a fixed location for a user to come and plug-in their EV and receive the electrical power supplied (from the for field repairable and upgradable electric vehicle charger 100) for charging their EV. The field repairable and upgradable electric vehicle charger 100 can comprise components (not shown in FIG. 1) needed in order to function as a Level 2 EV charger, including but not limited to: a power supply (e.g., 208-240 V); and connectors (e.g., SAE11772 connector) which can be inserted directly into a charging port of an EV to facilitate the transfer of electrical power (between the charger 100 and the EV) that charges a battery of the EV.

FIG. 1 illustrates particular components of the field repairable and upgradable electric vehicle charger 100 that collectively achieve the EV charger's 100 distinct modular structure and EV charging capabilities. As seen in FIG. 1, the disclosed field repairable and upgradable electric vehicle charger 100 comprises several components, including: a display screen 1; attachment elements 2 shown as screws; removable motherboard container 3; rack 4; rack holder 5; input power cable 6; charging plug 7; motherboard 8; enclosure 9; face 10; and camera 11.

The display 1 can be a digital display screen which presents visual information related to the operation of the field repairable and upgradable electric vehicle charger 100, for instance displaying details and feedback that is associated with the EV charging process (e.g., charging status, charging rate, battery level, connector status, payment information, error messages, and the like). The display 1 may be implemented in accordance with various types of digital display technology, such as LCD (Liquid Crystal Display), LED (Light-Emitted Diode), OLED (Organic Light-Emitted Diode), touchscreen-capable, and the like. The size and shape of the display 1 may vary based on the specific application and design objectives of the field repairable and upgradable electric vehicle charger 100.

As seen in FIG. 1, the field repairable and upgradable electric vehicle charger 100 comprises a removeable motherboard container 3. In the example of FIG. 1, the removeable motherboard container 3 has a substantially rectangular geometry, having an elongated flat bottom surface, two lateral surfaces, and no top surface such that the removeable motherboard container 3 is not enclosed and structured similar to a tray. Thus, the removeable motherboard container 3 has dimensions (e.g., length, width, height) and surfaces that form a shallow container suitable for stabling housing the internal electronic components that support the functionality of the field repairable and upgradable electric vehicle charger 100. FIG. 1 illustrates that the removable motherboard container 3 is designed to hold the internal electronics of the field repairable and upgradable electric vehicle charger 100, such as a motherboard, charging circuits, sensors, capacitors, resistors, integrated circuit chips such as microcontrollers and diodes, and other components as are typically required in the current state of the art EV charging circuits.

As will be described, the removeable motherboard container 3 functions as a physically separate module (contributing to the modular structure of the field repairable and upgradable electric vehicle charger 100) that is designed to cooperatively interact with another module of the field repairable and upgradable electric vehicle charger 100, namely the enclosure 9. That is, the removeable motherboard container 3 is configured to be: coupled to the enclosure 9, where it is arranged in an inserted position with the enclosure 9 such that the length of the removeable motherboard contained in placed inside of the enclosure 9 to stably hold and enclose the internal electronic components of the EV charger 100 therein; or decoupled from the enclosure 9, where it is arranged in a removed position with the enclosure 9 such that the length removeable motherboard container 3 is outside of the enclosure 9 allowing the internal electronic components of the EV charger 100 to be easily accessed.

FIG. 1 depicts the enclosure 9 as another module of the field repairable and upgradable electric vehicle charger 100, providing a main body for the EV charger's 100 structure. In the example of FIG. 1, the enclosure 9 has a substantially rectangular geometry, having surfaces, dimensions (length, width, height) and a substantively hollow internal area (e.g., compartment) that are suitable for the enclosure 9 to function as an enclosed compartment that houses the removable motherboard container 3 inside of its walls (e.g., surfaces) when the container 3 is coupled to the enclosure 9 in the inserted position. The enclosure 9 has an aperture along a lateral surface, where the aperture provides an opening to the enclosure 9 that receives the removable motherboard container 3. For example, the removable motherboard container 3 can be slidably inserted (e.g., along the rack 4) into the enclosure 9 and stably held inside of its compartment, where the enclosure 9 safely covers and stores the motherboard, circuits, and other internal electrical components that are contained therein. In this inserted position, the motherboard container 3 is fully coupled and enclosed inside of the enclosure 9, having the length of the removable motherboard container 3 being positioned inside of the internal compartment of the enclosure 9. When inserting the removable motherboard container 3 into the enclosure 9, the container 3 can be slid along the rack 4 in a direction towards the enclosure 9, until a lateral side of the container 3 is flush with the aperture, closing that surface wall of the enclosure 9 to fully enclose the internal electronics in the container 3 therein. The removable motherboard container 3 can stay in the inserted position with enclosure 9 while the field repairable and upgradable electric vehicle charger 100 is in use, for example during a charging process with an EV. Alternatively, the removable motherboard container 3 can be rearranged from the inserted position, where the container 3 is removed from the enclosure 9 while the field repairable and upgradable electric vehicle charger 100 remains essentially installed at the location as an EV charging station.

The removable motherboard container 3 is also configured to be decoupled (e.g., removed) from, or pulled out of, the enclosure 9. For instance, the removable motherboard container 3 is structured to slide out through the aperture (e.g., along the rack 4) of the enclosure 9 in a direction away from the body of the enclosure 9. When the removable motherboard container 3 is slidably decoupled from the enclosure 9, the length of the removable motherboard container 3 including the motherboard, circuits, and other electronic components are outside of the enclosure 9. When the removable motherboard container 3 is in the fully removed position, all of the contents of the removable motherboard container 3 are outside of the enclosure's 9 compartment, which allows for the motherboard, circuits, and other electrical components held by the container 3 to be easily accessed for repairing, replacing, upgrading, or testing while the EV charger 100 is currently at its installation location and being actively used as an EV charging station. Consequently, the field repairable and upgradable electric vehicle charger 100 has a distinct structure comprised of interfacing modules 3, 9 that allow the EV charger's 100 internal electronics to be safely enclosed (e.g., enclosure 9) and removed (e.g., removable motherboard container 3), even after the field repairable and upgradable electric vehicle charger 100 has been deployed.

Also, FIG. 1 shows that there are several components on the removable motherboard container 3. In the example of FIG. 1, the removable motherboard container 3 has attachment elements 2, shown as screws, that can be used to securely attached and/or detach the removable motherboard container 3 from the enclosure 9. In an embodiment, the attachment elements 2 are screws designed with a proprietary head that requires a matching screwdriver to access them. The attachment elements 2 are positioned in each corner of the lateral surface that closes against the enclosure 9, which allows the attachment elements 2 to be used to securely fasten the removable motherboard container 3 to the enclosure 9 when in the inserted positioned. In contrast, the attachment elements 2 can be loosened in order to detach the removable motherboard container 3 from the enclosure 9. By loosening the screws, the removable motherboard container 3 can then be slidable moved out of the enclosure 9 and into the removed positioned where it is physically separated from the enclosure. The attachment elements 2 can be implemented as other forms of mechanical fastening mechanisms, including nails, bolts, nuts, clamps, anchors, rivets, as deems appropriate and/or suitable.

The removable motherboard container 3 has a rack 4 that is disposed along a bottom surface of the container 3. The rack 4 can be structured as a protruding edge that serves as a rail mechanism to support the slidable movement of the removable motherboard container 3. The rack 4 can be mated with a rack holder 5 attached to the enclosure 9. For example, the rack holder 5 may be structured as having a groove (or trench) along a bottom internal surface of the enclosure 9 that mates and accepts the protruding edge of the rack 4, in a manner that guides a horizontal movement of the removable motherboard container 3. When the rack 4 of the removable motherboard container 3 is installed in the rack holder 5, the container 3 can then move, sliding to be inserted and/or removed from the enclosure 9.

FIG. 1 shows that there are several components on the enclosure 9. The rack holder 5 is attached to the enclosure 9 and is configured to receive the rack 4 that is attached to the removable motherboard container 3. The rack holder 5 can be formed using conductive materials such as copper among other metals and alloys, and could be secured within the enclosure 9 with magnets, hooks, and screws among other holding mechanisms to ensure stability.

As seen in FIG. 1, a front-facing surface of the enclosure 9 is shown as a face 10 of the field repairable and upgradable electric vehicle charger 100. The face 10 can be a surface of the field repairable and upgradable electric vehicle charger 100 that is intended to be visible and/or interactive for a user of the EV charge 100. For example, the display 1 is attached to the face 10 to provide a screen on a surface of the EV charger 100 that is facing towards the user for greater visibility, for instance displaying information pertinent to the EV charging process to be viewed by the user.

An input power cable 6 is depicted as extending from the face 10 portion of the enclosure 9. The input power cable 6 can be plugged into, or otherwise connected to, a power supply for the field repairable and upgradable electric vehicle charger 100. In an embodiment, the input power cable 6 is connected to a power source such as the electric grid accessed through a wall outlet or electrical panel. In some embodiments, the input power cable 6 is connected to a power source that is integrated with the field repairable and upgradable electric vehicle charger 100, such as a battery.

A charging plug 7 is also shown to extend from the face 10 portion of the enclosure 9. For example, the charging plug 7 may be a charging cable or extension, having a connector at its distal end that can be inserted directly into a charging port of an EV allowing the end of the charging plug 7 to be plugged into EV. By coupling the charging plug 7 to an EV, a transfer of electrical power (e.g., AC power) is facilitated from the field repairable and upgradable electric vehicle charger 100 which supplies a charge to the EV's battery. Additionally, FIG. 1 also shows that a camera 11 may be implemented in the field repairable and upgradable electric vehicle charger 100 having a lens positioned at the face 10 of the enclosure 9. The camera 11 enables image and/or video capture capabilities for the field repairable and upgradable electric vehicle charger 100 and may utilize a variation of lenses such as wide-angle lens among other types and variations of cameras.

Accordingly, the field repairable and upgradable electric vehicle charger 100 depicted in FIG. 1 realizes a modular architecture that allows portions of the EV charger 100 to be removed and re-inserted in a distinct manner. This modularity enables key components of the EV charger 100, such as the motherboard, which may degrade over time, to be accessible in a manner that supports on-site repairs, replacements, or updates, thereby substantially reducing an amount of time that a field repairable and upgradable electric vehicle charger 100 has to be off-line (e.g., for repairs) in comparison to conventional EV chargers used in industry.

Figure 2:
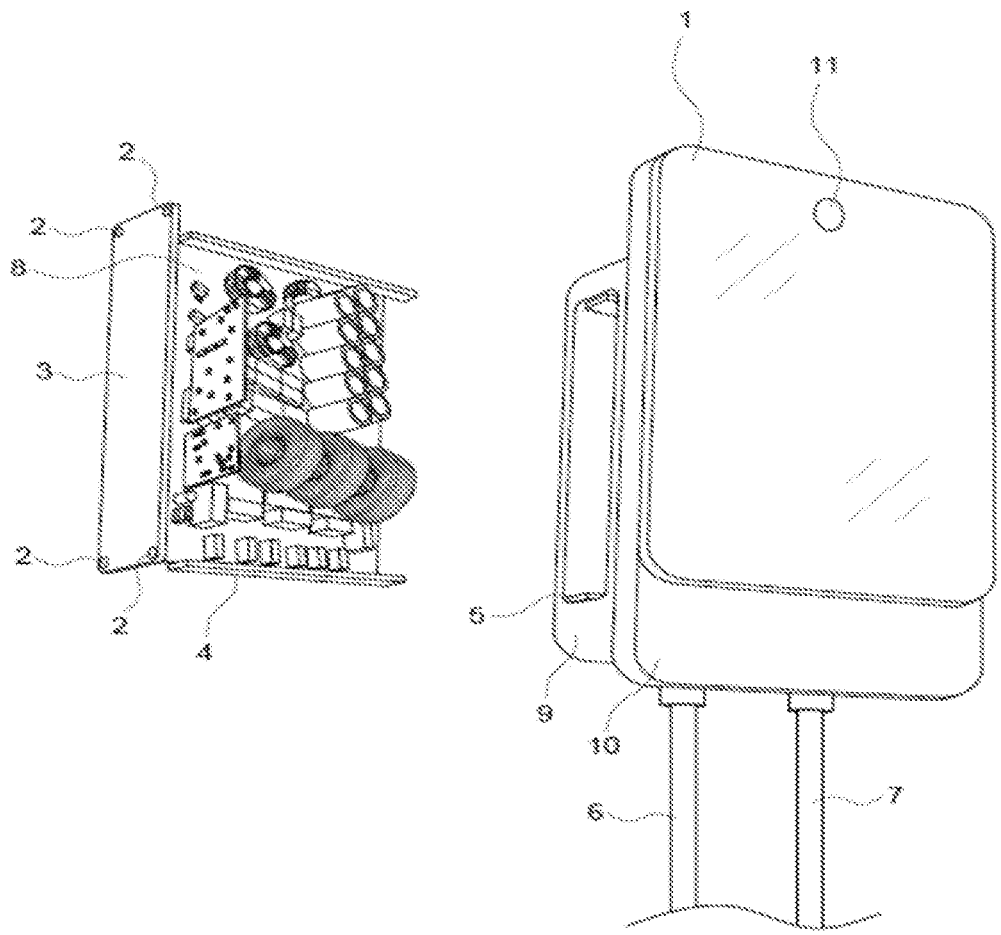
FIG. 2 depicts an example field repairable and upgradable electrical vehicle charger at a perspective view and having the motherboard container fully removed during operation, according to one or more embodiments shown and described herein.

FIG. 2 depicts the field repairable and upgradable electric vehicle charger 100, where the removeable motherboard container 3 is in a fully removed positioned. In operation, the field repairable and upgradable electric vehicle charger 100 can be mechanically de-energized by disconnecting the input power cable 6 in order to safely remove the removeable motherboard container 3. The field repairable and upgradable electric vehicle charger 100 can also be de-energized electronically through a signal sent wirelessly to the charging circuit via Bluetooth or Wi-Fi, among other processes and designs used in the current state of the art to de-energize live electric components. After de-energizing, the removeable motherboard container 3 can be safely unscrewed and removed from the enclosure 9 of the field repairable and upgradable electric vehicle charger 100. FIG. 2 illustrates that in the fully removed position, the entire length of the removable motherboard container 3 including the motherboard, circuits, and other electronic components are completely outside of the enclosure 9 allowing these elements to be easily accessible while the field repairable and upgradable electric vehicle charger 100 remains at its installed location and operating as an EV charging station.

Figure 3:
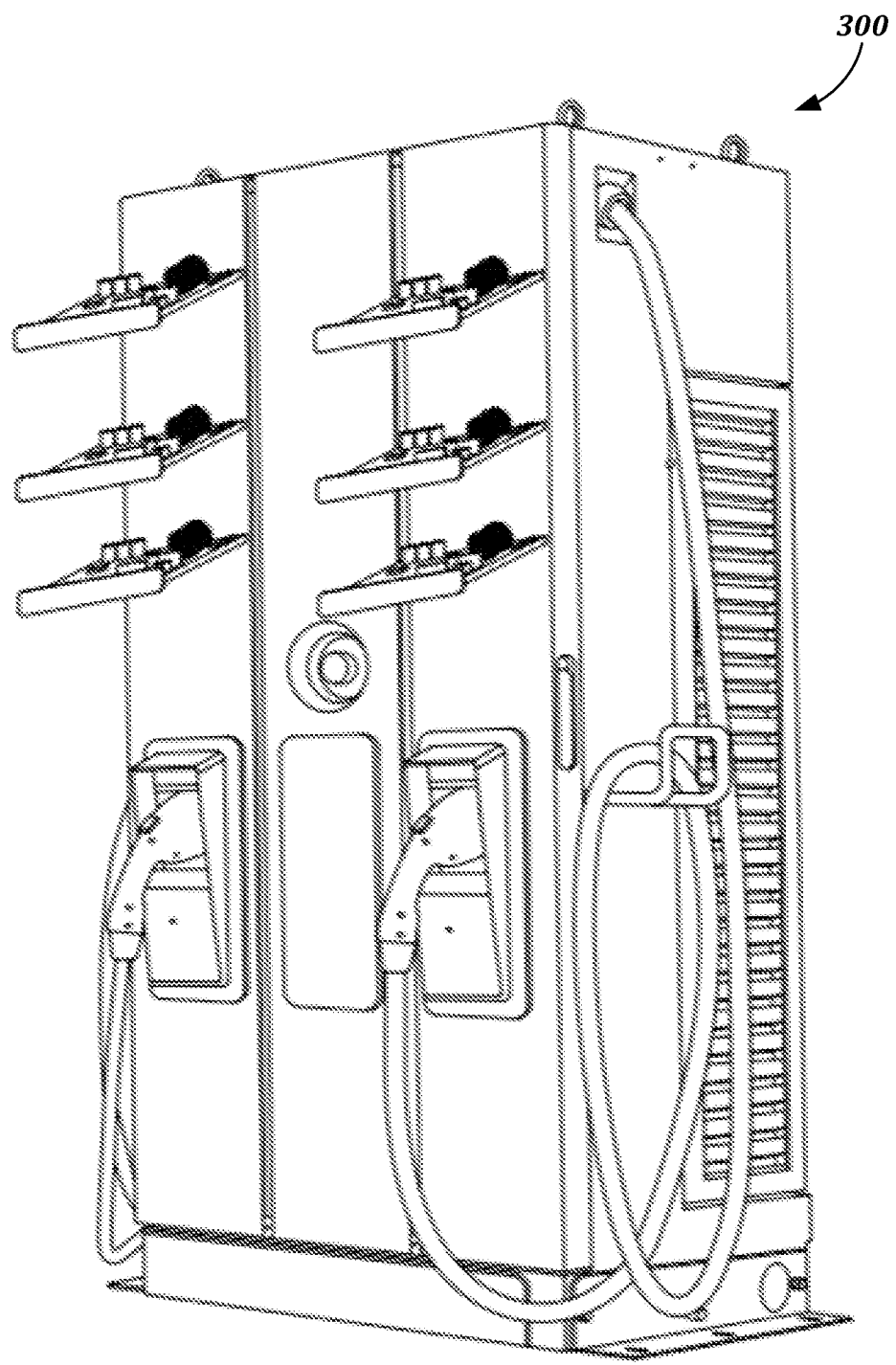
FIG. 3 depicts an example Level 3 EV charger for employing the field repairable and upgradable aspects, according to one or more embodiments shown and described herein.

FIG. 3 depicts a Level 3 EV charger 300 that can implement the field repairable and upgradable electric vehicle charger and functions as described above in reference to FIG. 1. The Level 3 EV charger 300 may be deployed as a charging station that is located at a designated location, such as a parking garage, mall parking lot, or other public location deemed suitable for EV charging. Accordingly, the Level 3 EV charger 3 can include an EVSE port that provides the power to charge at least one vehicle, and houses one or more power connectors (or plugs) that are compatible to be connected with an EV. In use, a power connector from the Level 3 EV charger 300 can be plugged into an inlet of an EV's charging port (designed to accept the appropriate connector). By coupling the system's 150 connector to the vehicle's 120 charging port, a transfer of electrical power (e.g., DC power) is facilitated which supplies a charge (e.g., shown as dashed line arrow in FIG. 1) to the vehicle's 120 battery. According to the embodiments, the Level 3 EV charger 300 acts a dedicated charging station, which includes one or more field repairable and upgradable electric vehicle chargers, as disclosed herein, integrated into its architecture, and operates in accordance with fast charging and/or DC fast charging standards.

The Level 3 EV charger 300, also referred to as a DC fast charger, can function as a high-power charging station that is capable of providing a significantly faster charging experience compared to Level 1 EV chargers and Level 2 EV chargers. Through DC fast charging, the Level 3 EV charger 300 can provide as much as 350 kW or more of power and fully charge an EV in as quickly as 15 minutes.

Figure 4:
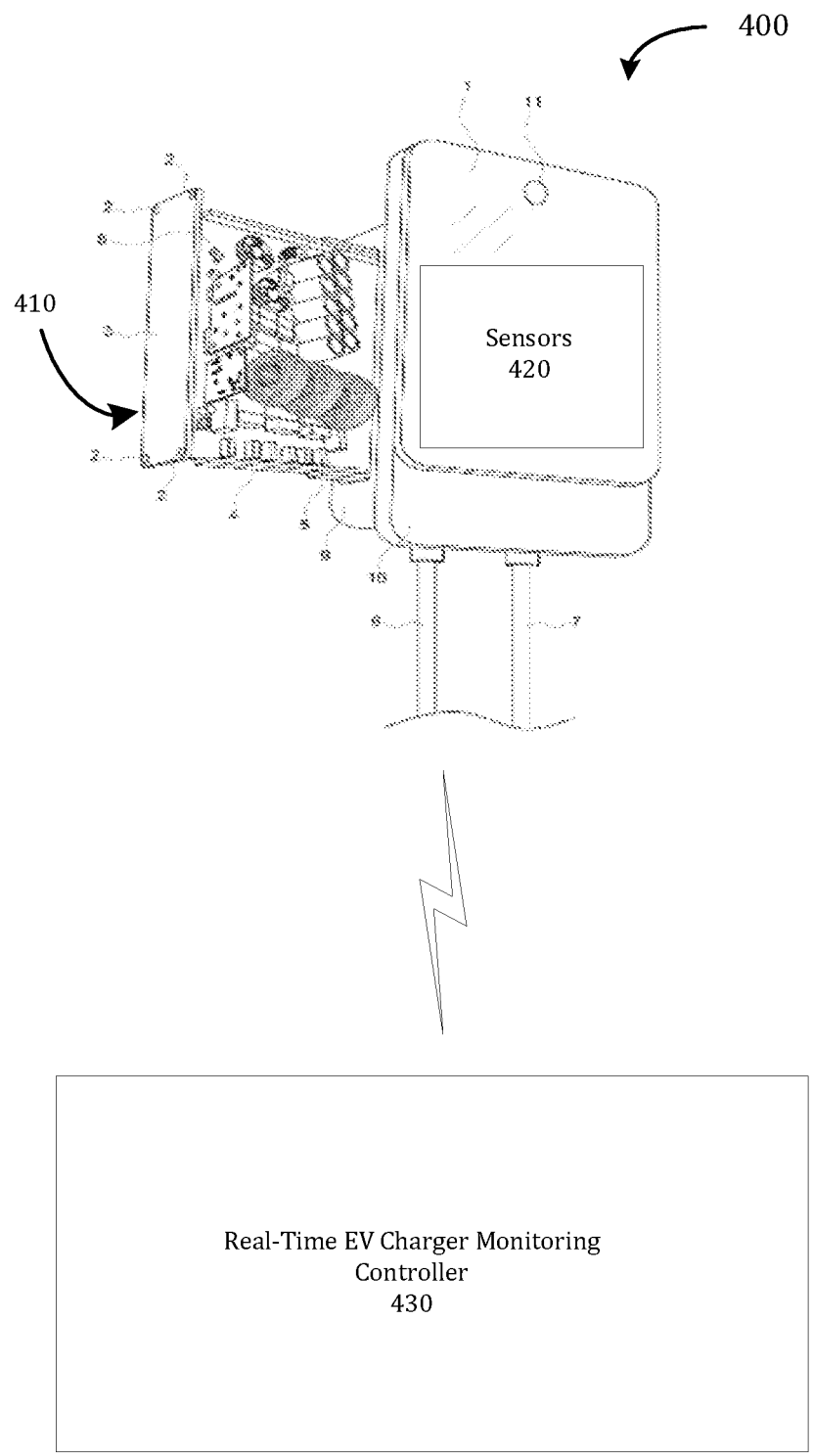
FIG. 4 depicts an example real-time EV monitoring system for use with the field repairable and upgradable electric vehicle charger, according to one or more embodiments shown and described herein.

FIG. 4 depicts a real-time EV charger monitoring system 400 for monitoring the operational parameters of an EV charger 410 in real-time during its operation to ensure that the EV charger 410 is operating optimally. In the example of FIG. 4, the real-time EV charger monitoring system 400 is utilized with the field repairable and upgradable electric vehicle charger 410, as disclosed herein. FIG. 4 illustrates the real-time EV charger monitoring system 400 including a plurality of sensors 420 that are integrated within the field repairable and upgradable electric vehicle charger 410 in order to collect real-time measurement data from several components of the EV charger 410. Thus, by obtaining real-time data from the sensors 420, the real-time EV charger monitoring system 400 can obtain and analyze the real-time values for different operational parameters of the EV charger 410 that indicate how the EV charger 410 is currently operating.

For example, the sensors 420 obtain data in real-time that is associated with operational parameters related to the EV charging functions of the EV charger 410, including temperature, power consumption, current flow, and the like. According to the embodiments, the sensors 420 are configured to continuously obtain measurements from the internal elements (e.g., hardware, electronics, etc.) of the EV charger 410 and/or obtain measurements pertaining to the external environment surrounding the EV charger 410 in real-time (e.g., per-second) or at another defined time intervals. The sensors 420 can obtain measurements of the external environment surrounding the EV charger 410 such as moisture levels, external noise, temperature, dust, force, and the like. By monitoring the external environment of the EV charger 410, the real-time EV charger monitoring system 400 can assess how characteristics outside of the EV charger 410 structure can impact its performance, such as the EV charger's 410 resilience to different weather conditions and evaluating of the impact of noise, for instance, where this information can ultimately be leveraged to facilitate design improvements for the EV charger 410 like more durable and environmentally charging stations.

The real-time EV charger monitoring system 400 also includes a real-time EV charger monitoring controller 430. In the example of FIG. 4, the real-time EV charger monitoring controller 430 is implemented as a computer device, such as a laptop computer, that is communicatively connected to the sensors 420 of the system 400. The EV charger monitoring controller 430 may communicate with the sensors 420 via wireless networking technology, such as Wi-Fi, Bluetooth, etc. Alternatively, the sensors 420 are connected to the real-time EV charger monitoring controller 430 via wire technology, such as a physical USB connection. Thus, the real-time EV charger monitoring controller 430 can receive the real-time data collected by the sensors 420, namely the operational parameters of the EV charger 410, in order to conduct further analysis. The real-time EV charger monitoring controller 430 can include computer hardware devices, including elements such as processor(s), central processing units(s) (CPU) or controller(s), memory that is programmed to perform the real-time monitoring functions. In an embodiment, the real-time EV charger monitoring system 400 is implemented as a computer device that is integrated within the hardware of the EV charger 410 itself.

For example, while the EV charger 410 is currently operating to charge a plugged-in EV, the real-time EV charger monitoring controller 430 can continuously receive data from the sensors 420 in real-time as a mechanism to monitor its current operational status. Furthermore, the real-time EV charger monitoring controller 430 analyzes the real-time data from sensors 420 to determine whether the measured operational parameters present any indication that the EV charger 410 is having anomalous operations, for instance operating outside of its nominal limits (e.g., errors, failures, degradation, etc.). For example, sensors 420 may be placed at the charging contacts (e.g., connectors) of the EV charger 410 which measure a temperature at the contact interface between the EV and the EV charger 410 in real-time throughout the EV charging process. The real-time EV charger monitoring controller 430 receives the real-time temperature measurements collected by the sensors 420, and subsequently monitors and analyzes the temperature operational parameter of the EV charger 410 in a manner that allows the real-time EV charger monitoring controller 430 to detect whether there are unusually high heat levels at the contact interface between the EV and the EV charger 410. In an embodiment, the real-time EV charger monitoring controller 430 is configured to utilize artificial intelligence (AI)/machine learning (ML) approaches to monitor and analyze the operational parameters of the EV charger 410. For example, real-time EV charger monitoring controller 430 can train AI/ML models over time using the real-time data collect from sensors 420 at the EVB charger 410 to be able to learn trends and predictively determine that an operational parameter is reaching and may exceed its proper limits (indicating anomalous operations).

Referring back to the previous example, in the case where the real-time EV charger monitoring controller 430 determines that there are dangerously high temperatures at the EV charger 410 during charging, the current status of that operational parameter can be an indication that there is EV charger 410 is having anomalous operations, particularly severe overheating problem at the EV charger 410 which requires immediate action, such as disconnection from the EV, shut-down of the EV charger 410, and/or repair of components at the EV charger 410. In an embodiment, the EV charger monitoring controller 430 is also configured to perform automatic corrective actions, in response to monitoring the operational parameters of the EV charger 410. For instance, the EV charger monitoring controller 430 can have the ability to automatically adjust the operation of the EV charger 410, regulating temperature (e.g., triggering cooling functions, decrease charging rate, etc.) at the EV charger 410 as result of monitoring high temperature conditions at the EV charger 410. In some embodiments, the EV charger monitoring controller 430 may be configured to execute other corrective actions related to the real-time monitoring of the operational parameters of the EV charger 410, such as optimizing charging algorithms and/or hardware enhancements, and automatically alerting maintenance personnel in the event of a detected operational problem to prevent damage (e.g., to the EV and/or the EV charger 410) or safety risks.

Thus, by actively monitoring the function of the EV charger 410 in real-time, the real-time EV charger monitoring system 400 can enhance the EV charger's charging efficiency, safety, and overall performance. Moreover, operational information for EV chargers that can be gleaned from the real-time EV charger monitoring system over time can be used to improve the design and development of EV chargers in a manner that improves on any degradation and failures detected after deployment (e.g., while the EV chargers are being used in the field), thereby providing better performance for EV chargers currently used in industry and in the future to progress the technology.

Figure 5:
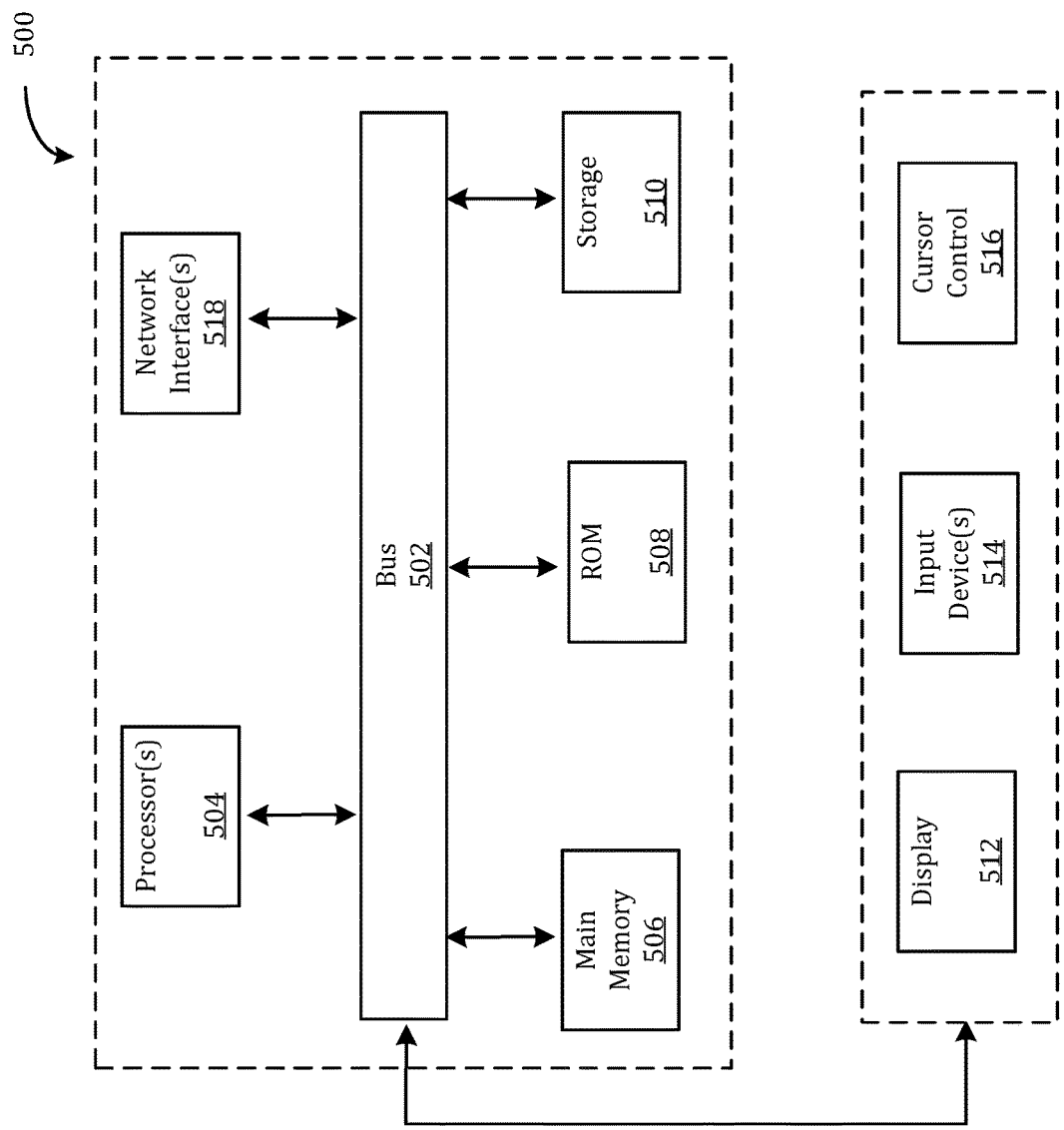
FIG. 5 depicts an example of a computer system that may be used in implementing the real estate transaction platform system, according to one or more embodiments shown and described herein.

FIG. 5 depicts a block diagram of an example computer system 500 in which the disclosed aspects of the field repairable and upgradable electric vehicle charger and/or the real-time EV charger monitoring system may be implemented. Furthermore, it should be appreciated that although the various instructions are illustrated as being co-located within a single processing unit, there may be some implementations in which processor(s) includes multiple processing units, allowing one or more instructions may be executed remotely from the other instructions.

The computer system 500 includes a bus 502 or other communication mechanism for communicating information, one or more hardware processors 504 coupled with bus 512 for processing information. Hardware processor(s) 504 may be, for example, one or more general purpose microprocessors.

The computer system 500 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Python, Ruby on Rails or NodeJS. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 2400 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local networks and Internet both use electrical, electromagnetic or optical signals that carry digital data streams. The signals through the various networks and the signals on network link and through communication interface 518, which carry the digital data to and from computer system 510, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution. In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. An electric vehicle charger device, comprising:
    an enclosure with an aperture along a lateral surface of a lateral side of the enclosure, the aperture borders a compartment;
    a rack holder with a first track oriented parallel to a second track, the first track and the second track are connected to an internal wall surface of the compartment of the enclosure, the first track and the second track partially border an inner perimeter edge of the aperture of the enclosure;
    a face disposed at a surface of a first side of the enclosure located perpendicular to the lateral side of the enclosure with the aperture;
    a display screen disposed at a first surface of a first side of the face;
    a removable motherboard container with a rack to couple to the enclosure and decouple from the enclosure, the rack has a rail mechanism with a protruding edge, the protruding edge of the rail mechanism of the rack slidably traverses at least a portion of the first track of the rack holder of the compartment of the enclosure, the removable motherboard container has an elongated substantially planar bottom located between a pair of lateral side walls, the removable motherboard container has no top surface in which the removable motherboard container is not enclosed; and
    the removable motherboard container holding modular internal electronics of the electric vehicle charger device, wherein the removable motherboard container is structured to be coupled to the enclosure for enclosing the modular internal electronics within the compartment and structured to be decoupled from the enclosure for removing the modular internal electronics from the compartment while the electric vehicle charger device remains installed at a location;
    wherein the modular internal electronics further comprises:
        a motherboard;
        the motherboard container configured to house the motherboard;
    wherein the enclosure is connected to an input power cable from a power supply providing electrical power for charging an electric vehicle;
    wherein the electric vehicle charger device is coupled to a real-time electric vehicle charger monitoring system;
    wherein the real-time electric vehicle charger monitoring system comprises sensors measuring operational parameters of the electric vehicle charger device in real-time while charging the electric vehicle; and
    wherein the power supply provides the electrical power for charging the electric vehicle in accordance with at least one of: Level 1 electric vehicle charging, Level 2 electric vehicle charging, and Level 3 electric vehicle charging.

2. The electric vehicle charger device of claim 1, wherein the removable motherboard container is coupled to the enclosure by sliding the removable motherboard container to an inserted position inside of the compartment.

3. The electric vehicle charger device of claim 2, wherein the removable motherboard container comprises attachment elements for securely fastening the removable motherboard container to the enclosure while in the inserted position.

4. The electric vehicle charger device of claim 1, wherein the removable motherboard container is decoupled from the enclosure by sliding the removable motherboard container to a removed position outside of the compartment.

5. The electric vehicle charger device of claim 4, wherein the removable motherboard container in the removed position enables access to the modular internal electronics of the electric vehicle charger device for repair, upgrade, and replacement.

6. The electric vehicle charger device of claim 1, wherein the enclosure is attached to a camera of the display screen.

7. The electric vehicle charger device of claim 1, wherein the real-time electric vehicle charger monitoring system comprises a real-time electric vehicle charger monitoring controller to analyze the operational parameters of real-time parameters to detect one or more anomalous operations of the electric vehicle charger device.

8. The electric vehicle charger device of claim 7, wherein the real-time electric vehicle charger monitoring controller is configured to automatically execute one or more corrective actions in response to detecting anomalous operations of the electric vehicle charger device.

9. An electric vehicle charger device, comprising:
    an input power cable;
    an enclosure with an aperture along a lateral surface of a lateral side of the enclosure, the aperture borders a compartment;
    a rack holder with a first track oriented parallel to a second track, the first track and the second track are connected to an internal wall surface of the compartment of the enclosure, the first track and the second track partially border an inner perimeter edge of the aperture of the enclosure;
    a face disposed at a surface of a first side of the enclosure located perpendicular to the lateral side of the enclosure with the aperture;
    a display screen disposed at a first surface of a first side of the face;
    a removable motherboard container with a rack to couple to the enclosure and decouple from the enclosure, the rack has a rail mechanism with a protruding edge, the protruding edge of the rail mechanism of the rack slidably traverses at least a portion of the first track of the rack holder of the compartment of the enclosure, the removable motherboard container has an elongated substantially planar bottom located between a pair of lateral side walls, the removable motherboard container has no top surface in which the removable motherboard container is not enclosed; and the removable motherboard container holding modular internal electronics of the electric vehicle charger device, wherein the removable motherboard container is structured to be coupled to the enclosure for enclosing the modular internal electronics within the compartment and structured to be decoupled from the enclosure for removing the modular internal electronics from the compartment while the electric vehicle charger device remains installed at a location;

wherein the modular internal electronics further comprises:
   a motherboard;
   the removable motherboard container configured to house the motherboard;

a real-time charger monitoring system comprising sensors for collecting real-time data from the modular internal electronics within the electric vehicle charger device in real-time while charging an electric vehicle, wherein the sensors are configured to:

measure and track internal variables of at least one of: heat, voltage, and current;

measure and track external variables of at least one of: air, water and pressure;

measure and track additional variables of at least one of: dust and ambient temperature;

track one or more components of the modular internal electronics and motherboard components based on data received from the sensors;

provide data to predictively determine that one or more operational parameters is approaching or exceeding a threshold;

based on the one or more operational parameters is approaching or exceeding the threshold, alerting a monitoring controller to perform an automatic corrective action;

based on the one or more operational parameters is approaching or exceeding the threshold, notifying a user to make a repair; and a display configured to display the one or more operational parameters and status of the modular internal electronics.

10. The electric vehicle charger device of claim 9 further comprising:
wherein the sensors are configured to provide real-time measurement of the one or more operational parameters at predetermined time intervals including one or more of the following: an internal temperature, an external temperature, a power consumption level, a current flow, a moisture level, an external noise level, a dust reading, and a force reading;

wherein the real-time measurement of the one or more operational parameters at the predetermined time intervals provides data to the real-time charger monitoring system periodically at the predetermined time intervals.

11. The electric vehicle charger device of claim 10 further comprising wherein:

the internal temperature is configured to provide a temperature reading of a hardware and modular internal electronics of the electric vehicle charger device;

the external temperature is configured to provide an ambient temperature of an environment external to the electric vehicle charger device;

the power consumption level is configured to provide a power consumption reading of the hardware and modular internal electronics of the electric vehicle charger device;

the current flow is configured to provide a current flow reading of the hardware and modular internal electronics of the electric vehicle charger device;

the moisture level is configured to provide a moisture level reading of the hardware and modular internal electronics of the electric vehicle charger device;

the external noise level is configured to provide an external noise level reading of the environment external to and surrounding the electric vehicle charger device;

the dust reading is configured to provide a dust reading of a dust level proximate to the hardware and modular internal electronics of the electric vehicle charger device; and the force reading is configured to provide a measure of force applied to the electric vehicle charger device.

\* \* \* \* \*